Figure 6:
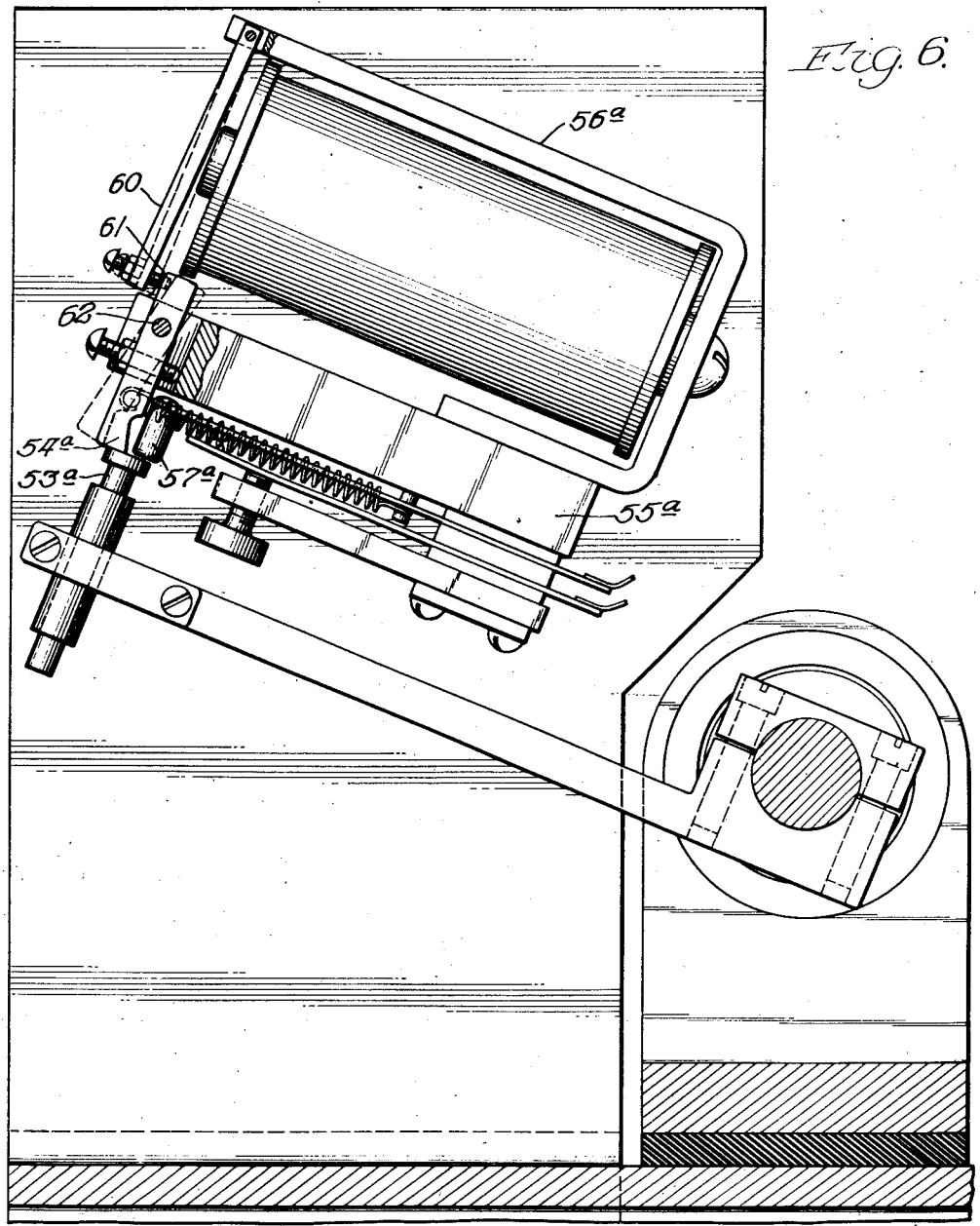

Jan. 31, 1939.  C. PFANSTIEHL  2,145,276
WELDING TIP
Filed May 29, 1937  3 Sheets-Sheet 1
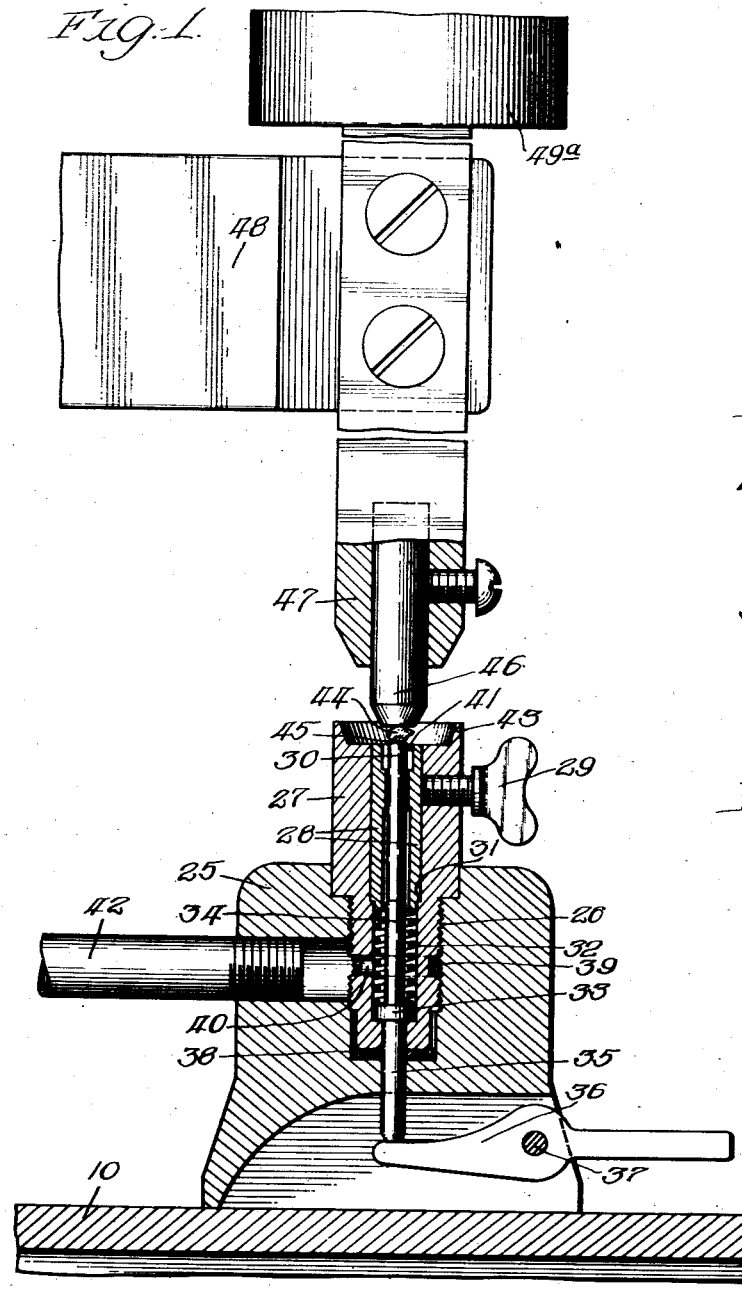
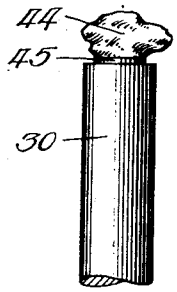
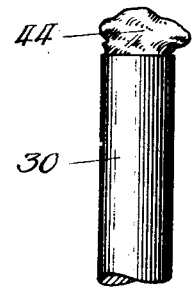
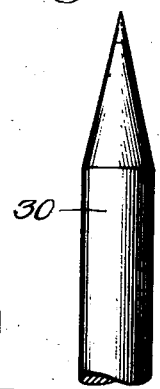
Inventor:
Carl Pfanstiehl,
By Clinton, Wiley, Davies, Hirsch & Lawson,
Attys.

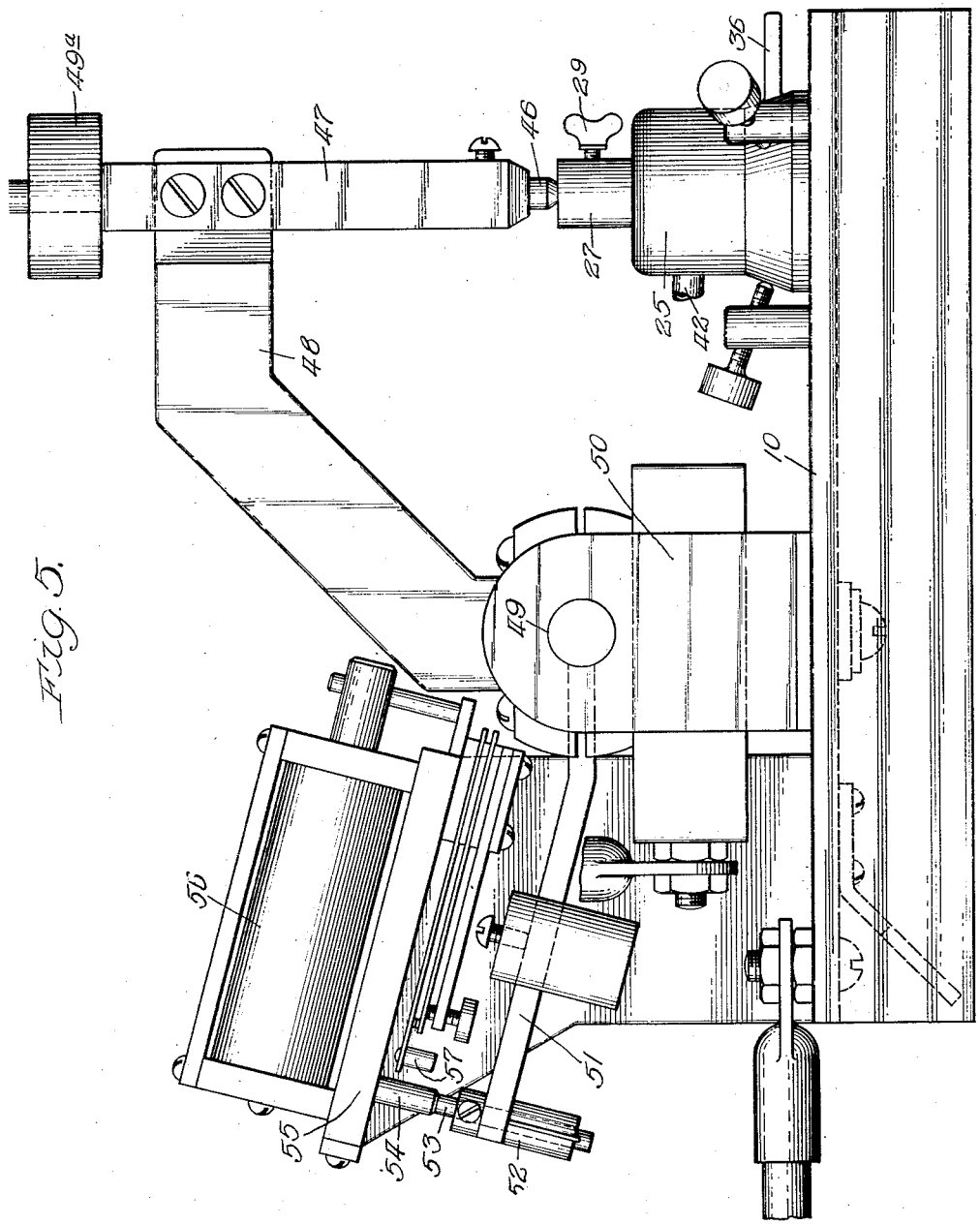

Jan. 31, 1939. C. PFANSTIEHL 2,145,276
WELDING TIP
Filed May 29, 1937 3 Sheets-Sheet 3

Inventor:
Carl Pfanstiehl,
By Christen, Wiles, Davies, Hirsch & Dawson,
Attys.

Patented Jan. 31, 1939

2,145,276

UNITED STATES PATENT OFFICE 2,145,276

WELDING TIP

Carl Pfanstiehl, Highland Park, Ill., assignor to Pfanstiehl Chemical Company, a corporation of Illinois Application May 29, 1937, Serial No. 145,611

1 Claim. (Cl. 219—10)

This invention relates to a process for welding tips to bases and particularly to the welding of hard tips on staffed materials such as phonograph needles and meter pivots.

This application is a continuation in part of my co-pending application Serial Number 126,712, filed February 19, 1937, and the apparatus herein described is a modification of a portion of the apparatus completely described in that application.

The invention is illustrated in the drawings, in which Fig. 1 is a sectional broken elevation of the welding apparatus; Fig. 2 is an enlarged view of a staff with a pellet above it before welding, and Fig. 3 is a similar view after welding; Fig. 4 is a view of a phonograph needle after grinding and polishing; Fig. 5 is an elevation of the welding apparatus; and Fig. 6 is a sectional elevation of a modified form of cut-off and adjusting device.

The welding apparatus comprises a base 10 upon which is mounted an apertured support 25. The support is drilled at the top to provide a well 26 into which the jaw holder 27 is screwed. The jaws 28 are loosely mounted within the jaw holder and a wing screw 29 is provided to force them into engagement with a staff 30 mounted within them. The lower end of the jaws rests upon the annular shoulder 31 between which and the table 33 a spring 32 is confined. A plunger 34 is mounted upon the table 33, and an arm 35 depends from the table and is engaged by the knockout lever 36 pivotally mounted at 37. Felt backing 38 is provided around the arm 35 to prevent the escape of hydrogen. An annular groove 39 is provided in the lower portion of the jaw holder 27 and an opening 40 from this groove admits hydrogen into the spring well from which it passes upwardly and emerges between the jaws and around the staff through the openings 41. Hydrogen is admitted to the apparatus through the tube 42.

The jaw holder 27 is provided with an upturned flange 43 at its upper portion which produces a dished depression within which the top of the staff 30 and the table 45 are confined.

As shown in Fig. 2, the staff 30 is provided with a table 45 at its upper end. This table is preferably very small in height, say about 0.005" and the radius of the table is about 0.005" less than that of the staff. Thus with a staff 0.068" in diameter the table is approximately 0.050" in diameter.

In carrying out the welding operation this table 55 has a tendency to melt before the remainder of the staff, owing to the greater resistance to the passage of electric current therethrough. Therefore in welding it melts first and the pellet 44 drops to the level of the remainder of the staff and means are provided for shutting off the current when the pellet has dropped that distance, as shown in Fig. 5.

Upon the pellet 44 a hard copper alloy head 46 is rested, this head being retained in the holder 47 mounted on the arm 48. A light weight 49ª may be provided to assist in the welding, although ordinarily a lightly pressed contact is preferred. The arm 48 is pivoted at 49 in the support 50 likewise mounted on the base 10. Likewise mounted on the pivot at 49 is an arm 51 having frictionally held in a mounting 52 at the end thereof a plunger 53 which engages a stud 54 on the platform 55.

As more fully described in my copending application 126,712, an electromagnetic means 56 is provided whereby after setting of the plunger 53 against the stop 54, the platform 55 is moved by operation of the current just before welding, to a position in which the head 57 overhangs the plunger 53. Then when the arm 47 drops upon melting of the table 45, the plunger 53 contacts the lug 57 and breaks the current, preventing excessive fusion.

With the table arrangement, however, it is possible in some instances to dispense with the automatic cutoff, the current being regulated so that when the table has melted the resistance of the entire staff is low enough so that once the table has melted no more material will fuse. This is particularly true where the pellets are regular in shape and uniform in shape. However, the automatic cutoff is essential for extremely irregular pellets.

The fused material from the table wets the pellet 44 by surface tension and provides an extraordinarily good weld.

The invention is particularly adapted to forming tips upon objects such as phonograph needles, and particularly phonograph needles in which a steel staff is used with a tip of much harder and higher melt point material.

For example, in connection with a tip comprised largely of tungsten and osmium, the tip is extremely hard and substantially infusible. It is therefore important that the weld be carefully made.

My preferred needle staff is a steel rod, for example an ordinary steel drill rod, containing from 0.9 to 1.0% of carbon and partially hardened. Such a staff, combined with a tip largely tungsten and osmium, appears to provide optimum tonal balance. Greater tone volume may be secured by using a somewhat harder steel such as that known as "Silcrome". An annealed soft cold rolled steel containing very low carbon produced lower tone volume, but less surface scratching.

The "Silcrome" steel is a high chromium, low carbon steel, hardened by extensive cold rolling and drawing. It had a hardness as measured on a Rockwell superficial hardness testing machine of —15 N 84–85.

The slightly hardened drill rod had a hardness of 15 N 71–75. The annealed soft cold rolled steel had a hardness of 15 N 67–69.

In carrying out the welding operation the tip may be welded by the use of a thin brazing disk of copper or other brazing material placed between the pellet and the staff, in this instance the copper alone being melted. However, this does not give as strong a bond as when the tip is welded directly to the steel, particularly with irregular tips.

The preferred needle is finished in a black corrosion resistant chemical finish, which provides a pleasing contrast with the silvery white metallic tip.

The device shown in Fig. 6 is a somewhat simpler modification of the structure shown in Fig. 5. In this case the electromagnetic means $56^a$ and the platform $55^a$ are stationary. The stop $54^a$ however is movable as shown by the dotted line. During the setting operation it is in the position shown in solid ink and engages the plunger $53^a$. On actuation of the magnet, however, the bar 60 is drawn toward the magnet, engages the shoulder 61 of the upper end of the stop $54^a$ which is pivotally mounted at 62, and swings the stop out of engagement with the plunger, leaving it free to contact the lug $57^a$ upon drop of the platform.

What I claim as new and desire to secure by Letters Patent is:

The method which comprises placing a metallic rod of a diameter of approximately $\frac{1}{8}$ inch in upright position, said rod having an integral table at its upper end of slightly lesser diameter and of a height not in excess of 0.01 inch, the sides of the table being parallel to the axis of the rod, placing a small irregularly shaped pellet of higher melting point tip material thereon, the pellet being relatively large compared to the table, and fusing the table by an electric current passed therethrough, thereby causing the pellet to drop the height of the table and become embedded in the fused table metal, and shutting off the current on the conclusion of the drop.

CARL PFANSTIEHL.